US012673289B2

(12) United States Patent
Schöffl

(10) Patent No.: US 12,673,289 B2
(45) Date of Patent: Jul. 7, 2026

(54) TREATMENT OF COMPRESSED GASEOUS HYDROGEN

(71) Applicant: BAUER KOMPRESSOREN GmbH, Munich (DE)

(72) Inventor: Manfred Schöffl, Wessling (DE)

(73) Assignee: BAUER KOMPRESSOREN GMBH, Munich (DE)

( * ) Notice: Subject to any disclaimer, the term of this patent is extended or adjusted under 35 U.S.C. 154(b) by 395 days.

(21) Appl. No.: 18/488,586

(22) Filed: Oct. 17, 2023

(65) Prior Publication Data

US 2024/0123394 A1     Apr. 18, 2024

(30) Foreign Application Priority Data

Oct. 18, 2022     (DE) ..................... 10 2022 127 312.1

(51) Int. Cl.
| | |
|---|---|
| *B01D 53/04* | (2006.01) |
| *B01D 46/00* | (2022.01) |
| *B01D 53/26* | (2006.01) |

(52) U.S. Cl.
CPC ....... *B01D 53/0446* (2013.01); *B01D 46/003* (2013.01); *B01D 46/0036* (2013.01); *B01D 46/0087* (2013.01); *B01D 53/0454* (2013.01); *B01D 53/261* (2013.01); *B01D 2253/102* (2013.01); *B01D 2253/106* (2013.01); *B01D 2253/116* (2013.01); *B01D 2256/16* (2013.01); *B01D 2257/80* (2013.01)

(58) Field of Classification Search
None
See application file for complete search history.

(56) References Cited

U.S. PATENT DOCUMENTS

| | | | | |
|---|---|---|---|---|
| 4,324,564 A * | 4/1982 | Oliker | .................... | B01D 53/06 |
| | | | | 95/137 |
| 5,895,769 A * | 4/1999 | Lai | ......................... | B01D 53/02 |
| | | | | 585/407 |
| 7,909,913 B2 * | 3/2011 | Hufton | ...................... | C01B 3/56 |
| | | | | 95/139 |
| 10,399,032 B2 * | 9/2019 | Russell | ................. | B01D 53/047 |
| 2022/0168688 A1 * | 6/2022 | Kim | .......................... | C01B 3/56 |
| 2024/0123394 A1 * | 4/2024 | Schöffl | .............. | B01D 46/0087 |

FOREIGN PATENT DOCUMENTS

| | | | | | |
|---|---|---|---|---|---|
| CN | 117380155 A | * | 1/2024 | .............. | B01J 20/20 |
| CN | 116196890 B | * | 5/2025 | .......... | B01D 53/047 |
| CN | 120205097 A | * | 6/2025 | .......... | C01B 32/354 |
| CN | 120398692 A | * | 8/2025 | .............. | C01B 3/56 |
| DE | 102023108231 A1 | * | 10/2024 | ........... | B60T 17/004 |
| KR | 20230127732 A | * | 9/2023 | ........ | H01M 8/04686 |

* cited by examiner

*Primary Examiner* — Brit E. Anbacht
(74) *Attorney, Agent, or Firm* — Rothwell, Figg, Ernst & Manbeck, P.C.

(57) ABSTRACT

The present invention relates to a system for treating gaseous hydrogen, comprising an inlet (10*a*) for supplying gaseous hydrogen, a drying unit (30) with an active drying material for removing moisture from the supplied hydrogen, an adsorption unit (50) with an active adsorption material for adsorbing impurities from the dried hydrogen, and an outlet (10*b*) for drawing off treated hydrogen. According to the invention, the mass ratio between the active drying material and the active adsorption material is in the range of 1.5:1 to 50:1. The invention further relates to a plant comprising such a system for providing compressed treated gaseous hydrogen and a method for treating gaseous hydrogen.

20 Claims, 2 Drawing Sheets

TREATMENT OF COMPRESSED GASEOUS HYDROGEN

CROSS REFERENCE TO RELATED APPLICATION

Figure 1A:
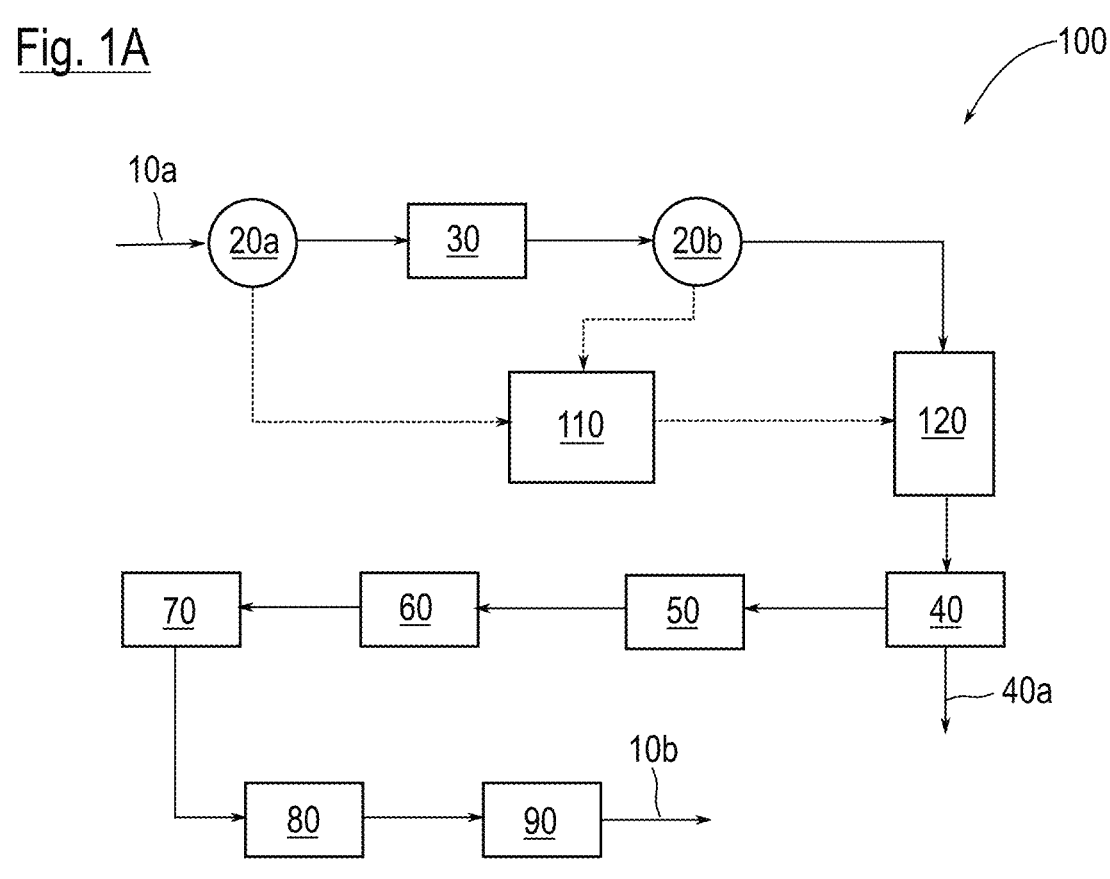

This application claims priority to and the benefit of German Patent Application No. 10 2022 127 312.1, filed on Oct. 18, 2022, the disclosure of which is incorporated herein by reference in its entirety.

DESCRIPTION

The present invention relates to a system for treating gaseous hydrogen, a plant for providing compressed treated gaseous hydrogen and a method for treating gaseous hydrogen, which can be carried out, for example, by means of such a system and/or such a plant.

Gaseous hydrogen is considered an important and promising raw material for many different applications, not only for use in the chemical industry, for example, but also increasingly as a medium for storing energy. For instance, during peak periods for generation of electricity by means of renewable energies, for example at times of high solar irradiation of photovoltaic systems or elevated production of electrical energy by wind power plants, surplus electrical energy can be used for the electrolysis of water or similar electrochemical processes for producing hydrogen. Such processes produce gaseous hydrogen which can then be stored, placed in gas storage facilities, or used directly.

If it is intended for energy storage, this hydrogen can either be used later in decentralized devices, such as hydrogen-powered vehicles, or it can be converted back into electricity to compensate for periods of lower power generation using renewable energies. Fuel cells, for example, which are already installed in some automobile models and are supplied by high-pressure hydrogen tanks, can be used for this purpose.

However, due to the high sensitivity of fuel cells to impurities, the hydrogen that can be used for such applications must be as pure as possible. The purity of the hydrogen that can be used for this purpose is specified, for example, in the standards DIN EN 17124 (Hydrogen fuel—fuel cell application for road vehicles) and ISO 14687 (Quality characteristics of hydrogen fuel for utilization in vehicular and stationary applications).

It has been shown that various impurities of available or freshly obtained hydrogen can be particularly relevant, and these must be removed prior to filling or further processing. On the one hand, this concerns moisture contained in the hydrogen gas which is present in the hydrogen gas as a result of the process, particularly in the case of the electrolytic separation of water into hydrogen and oxygen already mentioned above. On the other hand, particularly when oil-lubricated compressors are used to compress the hydrogen, corresponding impurities such as hydrocarbons are likely to be introduced into the hydrogen to a certain extent and consequently have to be removed again at a later stage.

It is therefore the task of the present invention to provide a system and a method whereby hydrogen produced in particular by means of electrolysis and compressed by an oil-lubricated compressor can be treated economically to the extent that it is suitable for use in applications where the hydrogen must satisfy the highest purity requirements.

To this end, according to a first aspect of the present invention, there is first proposed a system for treating gaseous hydrogen comprising an inlet for supplying gaseous hydrogen, a drying unit comprising an active drying material for removing moisture from the supplied hydrogen, an adsorption unit comprising an active adsorption material for adsorbing impurities from the dried hydrogen, and an outlet for drawing off treated hydrogen. According to the invention, the mass ratio between the active drying material and the active adsorption material is in the range of 1.5:1 to 50:1.

It should be noted that both the active drying material of the drying unit and the active adsorption material of the adsorption unit each have saturation limits, that is to say, depending on their mass, they can only absorb a certain amount of foreign substances before their efficiency decreases and is ultimately no longer sufficient for adequate treatment of the hydrogen gas. The mass ratio between the two active materials according to the invention simply and efficiently ensures that the system can be continuously operated up to the saturation point of the drying unit without reaching the saturation limit of the adsorption unit.

The value range according to the invention is based in particular on extensive simulations carried out by the present inventors to evaluate usual ranges of moisture values in gaseous hydrogen at its entry into a corresponding system, so as to achieve an optimum volume of gas to be treated for both the drying unit and the adsorption unit, thereby enabling economical and reliable operation of the system according to the invention. At the same time this avoids over-dimensioning of the active adsorption material of the adsorption unit in the system according to the invention, thus also allowing a more favorable and economical system design.

In the system according to the invention it is irrelevant whether the gaseous hydrogen to be treated is already compressed, that is to say, fed into the inlet of the system at an elevated pressure, or whether the compressor provided for this purpose is disposed downstream of the drying unit, resulting in a separation of the system into a low-pressure section and a high-pressure section with the compressor placed between them. In this connection, already at this point reference should be made to the plant according to the second aspect of the present invention, which will be discussed in detail below, and which itself includes the corresponding compressor.

According to the invention, the drying unit can comprise, as the active drying material, a molecular sieve known per se, which binds moisture contained in the gaseous hydrogen. In particular, it may be a hygroscopically pre-dried molecular sieve, although alternative drying agents could be used, such as silica gels. However, depending on their type and mass, such drying units always have a drying capacity or saturation limit which must not be exceeded in order to be able to ensure the required purity of the treated hydrogen.

Similarly, according to the invention, the adsorption unit may comprise, as the active adsorption material, activated carbon capable of adsorbing impurities present in the gas flow. The adsorption unit also has a maximum adsorption capacity for such impurities, which ultimately determines the maximum gas volume that can be treated. Once the capacity of the adsorption unit is exhausted, the corresponding active adsorption material must be replaced, for example, by replacing a cartridge containing the material or, in larger plants, by replacing the bulk active adsorption material itself. The same applies to the active drying material, which must also be replaced when its saturation limit is reached.

In order to monitor the quality and purity of the dried hydrogen, at least one pressure dew point sensor can be provided downstream of the drying unit according to the invention, which monitors the current pressure dew point of the hydrogen gas analyzed by it and outputs corresponding data. This data can in turn be used to determine in real time whether sufficient drying of the hydrogen gas has taken place or whether, for example, the drying unit has reached its capacity limit and, as a result, an unacceptable amount of residual moisture remains in the hydrogen gas. Monitoring the purity of the hydrogen gas in real time in this way avoids time-consuming sampling using test bottles and subsequent quality evaluations of the treated gaseous hydrogen in an external laboratory. Apart from their high cost, such quality evaluations are also disadvantageous in that they provide only a snapshot picture at the time of sampling, without covering the continuous operation of the plant in question as a whole. Consequently, the possibility of monitoring gas quality in real time by providing a pressure dew point sensor in the system according to the invention represents a significant advance in the quality assurance of the treated hydrogen.

According to the invention, alternatively or additionally, a further pressure dew point sensor can also be provided which is disposed upstream of the drying unit.

This makes it possible to collect further data points regarding the effect of the drying unit, since it also reports the moisture content of the hydrogen gas before it enters the drying unit. Thus, on the one hand, the quality of the supplied hydrogen at the inlet of the system can be monitored and, on the other hand, the effect of the drying unit can be further specified.

In this case the system may, for example, further comprise a control unit that can be coupled to the at least one pressure dew point sensor to receive the said sensor data and may be adapted to trigger a predefined action when a predefined pressure dew point threshold is exceeded. Such a predefined action can be, for example, the output of a warning or an immediate shutdown of the corresponding plant, and a plurality of predetermined pressure-dew point threshold values can also be defined, each of which triggers different actions of this nature.

To further ensure the required gas quality as well as safe operation of the system according to the invention, the system may further comprise at least one of the following:

A micro-separation unit disposed upstream or downstream of the drying unit

A post-drying unit disposed downstream of the adsorption unit

A particle filter disposed downstream of the adsorption unit and, if applicable, the post-drying unit A minimum pressure valve disposed downstream of the adsorption unit and, if applicable, the post-drying unit and/or the particle filter A pressure relief unit disposed upstream of the outlet.

The above-mentioned components that can be additionally provided in the system according to the invention make further contributions to the treatment of the hydrogen gas and to the safe operation of the system. In particular, the micro-separation unit can be designed as a coalescence separator, for example, and can separate droplet-shaped aerosols or also moisture present in the gas flow. In this case, the occurring moisture can be fed via an automatic condensate drain or manually via a condensate drain tap into a large-volume condensate collection tank, where it is stored and manually discharged from the plants, which are gas-tight to the environment, by an operator as part of regular maintenance.

The post-drying unit downstream of the adsorption unit may be provided because active adsorption materials, such as activated carbon in particular, always have residual moisture due to the manufacturing process, which may be partially taken up by the dried hydrogen during its passage through the adsorption unit. Consequently, by means of the post-drying process, the residual moisture thus released from the adsorption unit can itself be adsorbed, thereby ensuring, particularly after a change of the active adsorption material, which still has increased residual moisture at the beginning of its life cycle, that no moisture from the active adsorption material is introduced into the gas flow provided at the outlet of the system, potentially causing process impairments in downstream components or applications.

Following a similar principle, a particle filter provided downstream of the adsorption unit can safely remove solid particles or dusts from the hydrogen gas at that location that may have entered the gas flow from the active drying material and/or the active adsorption material in upstream components.

Additionally providing a minimum pressure valve can serve to ensure a necessary dwell time of the gaseous hydrogen to be treated in the upstream components, such as the drying unit and the adsorption unit, so that the corresponding treatment takes place as required in an operationally reliable manner. Furthermore, setting a minimum pressure in upstream components can prevent bursting or atomization of the active materials and thus clogging of the corresponding components, especially in case of rapid pressure drops in downstream applications.

The said pressure relief unit can be provided in order to be able to carry out safe and hazard-free pressure relief of the treatment section during maintenance of the system according to the invention, for example when one of the active materials has reached saturation point and needs to be replaced. Known components usually employed for such purposes, such as a pressure gauge, a pressure relief valve or a safety valve, may be used for this purpose.

According to a second aspect, the present invention relates to a plant for providing compressed treated hydrogen comprising a compressor for compressing supplied gaseous hydrogen and a system for treating the compressed gaseous hydrogen of the type just described according to the invention. Here, the compressor can be disposed upstream or downstream of the drying unit, so that either hydrogen supplied in a raw state or previously dried hydrogen can be compressed by the compressor at the corresponding point.

To be able to achieve the desired hydrogen pressures which may be needed, for example, when filling a pressure vessel with hydrogen, the compressor may be of multi-stage design, for example it may comprise a positive displacement compressor with an operating pressure of up to 350 bar or higher, and/or at least one heat exchanger may be assigned to the compressor, a heat exchanger possibly being placed downstream of each of the compressor stages, and a separator unit also being provided downstream of the heat exchangers after each of the compressor stages, which simplifies further compression in subsequent compressor stages and may already lead to condensation of moisture contained in the hydrogen, which can then be removed accordingly.

Furthermore, the plant according to the invention may comprise a plant control unit which is adapted to switch off the compressor when it is detected that the at least one predefined pressure dew point threshold value has been exceeded. In this case it is understood that the plant control unit can be operationally coupled with the above-mentioned control unit of the system according to the invention for treating hydrogen, or the two control units can if necessary be integrated into a single control unit. Moreover, it should not be ruled out that other measures can be taken if the predefined pressure dew point threshold is exceeded, such as opening a purge valve, in order to reliably ensure that under no circumstances does filling take place with inadequately treated hydrogen.

According to a third aspect, the present invention further relates to a method for treating gaseous hydrogen by means of a suitable system, in particular a system according to the invention, possibly integrated into a plant according to the invention, each of the type described above, comprising the steps of feeding the gaseous hydrogen at an inlet of the system, removing moisture from the fed hydrogen in a drying unit, adsorbing impurities from the dried hydrogen in an adsorption unit, and drawing off treated hydrogen at an outlet. In this case, the treated hydrogen can either be used to fill suitable pressure vessels or, for example, fed to a downstream process in which it is further used.

As previously mentioned, in the method according to the invention, a predefined measure can be triggered when at least one predefined pressure dew point threshold value is exceeded. In particular, a warning can be issued when a first predefined pressure dew point threshold value is exceeded, for example by means of a visual display or an acoustic signal, and a shutdown of the system and/or the plant can be initiated when a second predefined pressure dew point threshold value is exceeded.

As also previously mentioned, after carrying out the method according to the invention, the treated hydrogen may satisfy the requirements of DIN EN 17124 or ISO 14687 and/or the method according to the invention may include compressing the hydrogen to a pressure of up to 350 bar or higher.

Figure 1B:
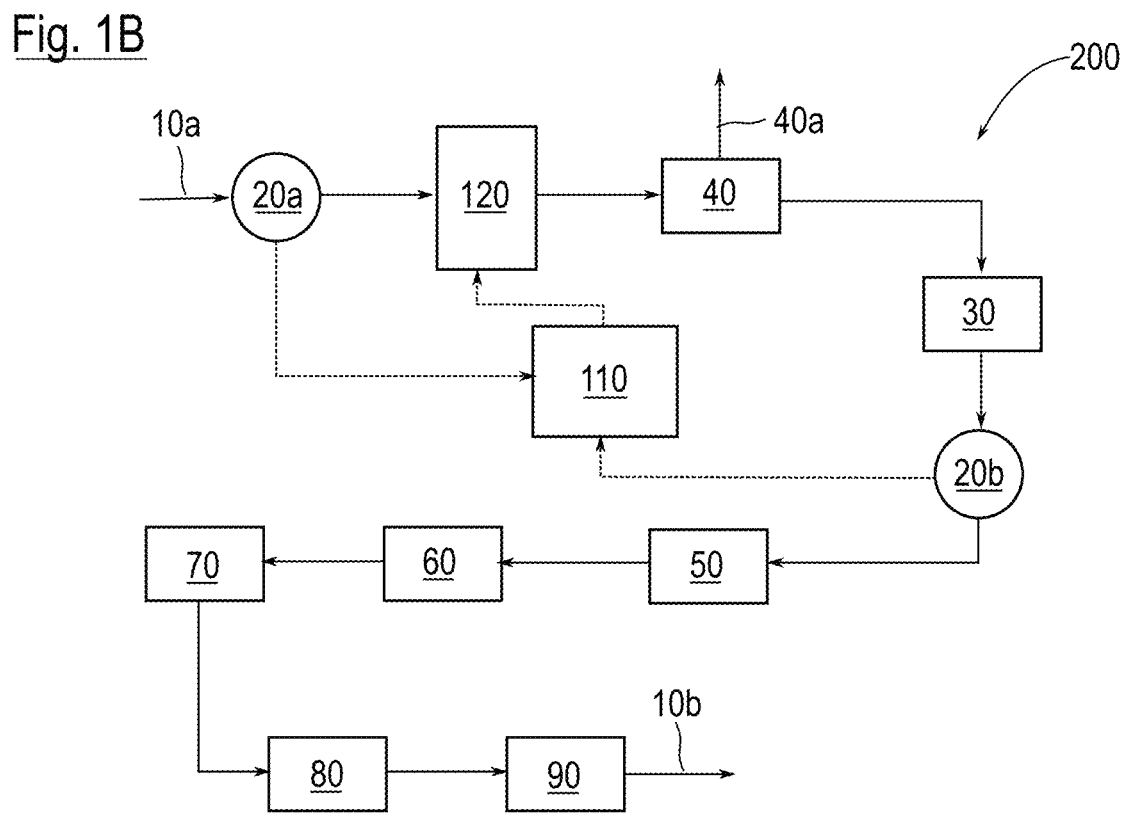
Figure 2:
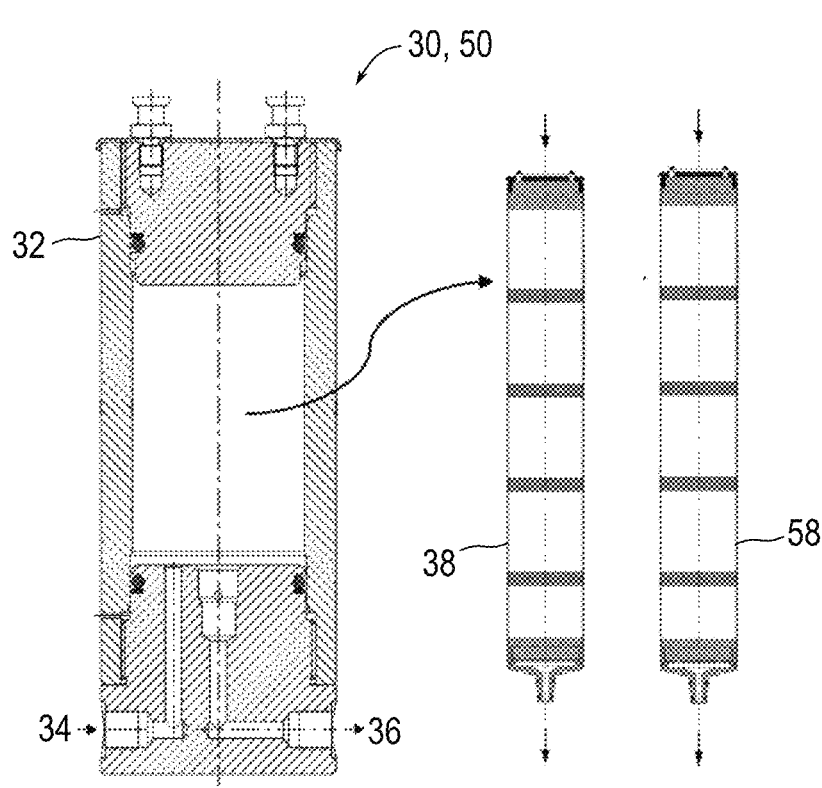
Figure 2:
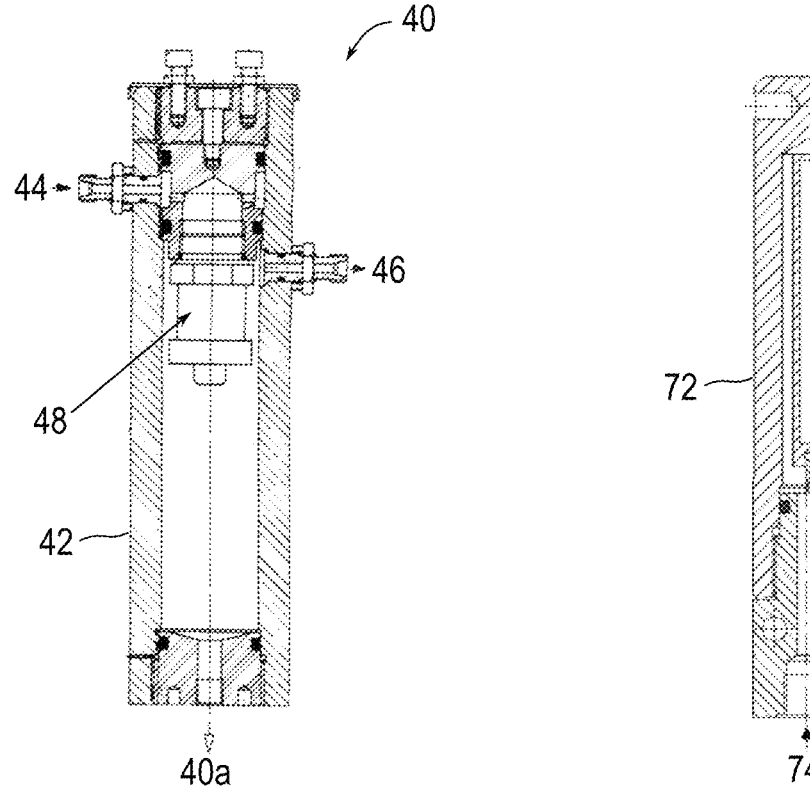

Other features and advantages of the present invention become clearer from the following description of embodiments thereof when considered together with the accompanying figures. These show the following:

FIG. 1A A process flow chart of a first embodiment of a plant according to the invention, FIG. 1B A process flow chart of a second embodiment of a plant according to the invention, and FIG. 2 A schematic representation of various components of the plants according to the invention shown in FIGS. 1A and 1B.

FIG. 1A shows a first embodiment of a plant according to the invention by means of a process flow chart, the plant being generally designated by the reference sign 100. At an inlet 10a, gaseous hydrogen produced by electrolysis of water, for example, is fed to the plant 100. The pressure dew point of the delivered hydrogen is first determined by means of a first pressure dew point sensor 20a before the hydrogen is supplied to a drying unit 30. In this drying unit 30, an active drying material is provided for removing moisture from the supplied hydrogen, and after the drying step a second pressure dew point sensor 20b can be used to track the result of the drying step.

For this purpose, the two dew point sensors 20a and 20b are coupled to a control unit 110 of the plant 100 which is adapted to check the data supplied by the two dew point sensors 20a and 20b in order to determine whether the drying step has been carried out in the desired manner and whether or not, for example, the drying unit 30 is already saturated. This also makes it possible already to monitor the moisture content of the delivered hydrogen and suitable measures can be taken if a predefined acceptable value range is exceeded. Furthermore, the control unit 110 is coupled to the compressor 120 referred to below and may be adapted to shut down the compressor 120 when at least one predefined pressure dew point threshold is exceeded, particularly at the dew point sensor 20b, to prevent compression of insufficiently purified hydrogen.

The second dew point sensor 20b is now followed by the compressor 120 just mentioned, which can be configured, for example, as a multi-stage compressor, heat exchangers for cooling the compressed hydrogen as well as separator units for separating liquid aerosol components in the gas flow being provided between the individual compression stages. The hydrogen gas compressed in this way is now fed to a final micro-separation unit 40 in which are deposited droplet-shaped aerosols and moisture which can be temporarily stored at arrow 40a and subsequently removed from the plant 100.

Downstream of the micro-separation unit 40, an adsorption unit 50 is subsequently provided in which an active adsorption material for adsorbing impurities from the dried hydrogen is accommodated, for example activated carbon within a replaceable cartridge or as a user-replaceable bulk material. This is followed by a post-drying unit 60 which, particularly after replacement of the active adsorption material in the adsorption unit 50, can first absorb residual moisture contained therein which has passed into the purified hydrogen gas.

Similarly, a particle filter 70 is provided downstream of the post-drying unit 60, which may possibly filter out any solid particles remaining in the hydrogen gas at this point, such as may have been entrained from the adsorption unit. Downstream of this is a minimum pressure valve 80, which serves to ensure a necessary dwell time of the hydrogen in the upstream components, in particular the drying unit 30 and the adsorption unit 50.

Finally, upstream of its outlet 10b, at which the treated compressed hydrogen gas can be drawn off, the plant 100 further comprises a pressure relief unit 90 which allows safe and hazard-free pressure relief in the plant 100 in a manner known per se. Within the plant 100, the components inlet 10a, pressure dew point sensors 20a and 20b, drying unit 30, micro-separation unit 40, adsorption unit 50, post-drying unit 60, particle filter 70, minimum pressure valve 80, pressure relief unit 90 and outlet 10b form a system according to the invention for treating hydrogen, with the control unit 110 also forming at least part of the system with regard to its functionality.

An alternative second embodiment of a system according to the invention is further shown in FIG. 1B and designated by the reference sign 200. Regarding the description of its individual components, reference should be made to the first embodiment just described. In particular, the plant 200 includes the exact same components as in the embodiment of FIG. 1A, but disposed in a modified sequence.

It should be noted, in particular, that in the embodiment 200 of FIG. 1B, the compressor 120 is disposed immediately downstream of the first pressure dew point sensor 20a, so that compressed gaseous hydrogen is already fed to the drying unit 30. Consequently, whereas in the embodiment of FIG. 1 the drying unit 30 and the adsorption unit 50 are provided upstream and downstream of the compressor 120 respectively, that is to say, in a low-pressure region and a high-pressure region of the plant 100 respectively, in the embodiment of FIG. 1B both the drying unit 30 and the adsorption unit 50 lie downstream of the compressor 120, that is to say, in a high-pressure region.

Here it should be noted, however, that in both of the shown embodiments of FIGS. 1A and 1B, the mass ratio according to the invention between the active drying material of the drying unit 30 and the active adsorption material of the adsorption unit 50 is in the same range of between 1.5:1 and 50:1, while the provision of the pressure dew point sensors 20*a* and 20*b* similarly makes it possible to monitor the gas quality of the hydrogen in the manner described.

It should further be noted that not all of the components just described are necessarily present in all possible embodiments. For example, if an active adsorption material is used that does not tend to release residual moisture to the gas flow, the downstream provision of a post-drying unit could be omitted. Furthermore, it should be noted that in other possible variants of systems according to the invention, the corresponding components may also be disposed in different sequences. For example, the drying unit 30 and the adsorption unit 50 could be disposed directly one after the other, in which case it would even be conceivable to integrate the two units, for example in a single housing or even a single cartridge, if the corresponding active materials are disposed in a suitable manner one after the other in the flow direction of the hydrogen gas.

For further explanation of the components used in the plants 100 and 200, reference is further made to FIG. 2, in which various components are schematically shown in cross-sectional views, in particular the drying unit 30 and the adsorption unit 50, the micro-separator 40 and the particle filter 70.

It should be noted here that the drying unit 30 and the adsorption unit 50 may each be formed in a similar manner by a pressure filter vessel as shown in FIG. 2 above. This comprises a pressure-tight housing 32 having an inlet 34 and an outlet 36, a corresponding cartridge being insertable into the housing 32. Thus, either the drying unit 30 or the adsorption unit 50 can be implemented in this way by inserting into the housing 32 either a drying cartridge 38 filled with a molecular sieve or other suitable desiccant, for example silica gel, or an adsorption cartridge 58 filled with, for example, activated carbon. Consequently, two similarly constructed pressure filter vessels can be used in the plants 100 and 200 respectively, which act as the drying unit 30 and the adsorption unit 50, depending on the cartridge with which they are equipped.

In both cases, the corresponding components act in such a way that the gas flow entering through inlet 34 flows freely upward and then passes downward through the layers of molecular sieve or activated carbon provided in the corresponding cartridges 38 and 58 respectively. The hydrogen gas treated in this way then exits the housing 32 at the outlet 36 and can be further treated in the next component of the system. At this point it should also be mentioned that, in certain variants of the system according to the invention, it is also possible to integrate the drying unit 30 and the adsorption unit 50 in such a way that the upper layers of the corresponding cartridge shown in FIG. 2 through which the hydrogen gas first flows contain the active drying material and the lower layers contain the active adsorption material. In this way, both components can be accommodated in a single housing 32, which on the one hand saves space and expense, but on the other hand only allows the two active materials to be replaced together and is therefore less flexible. For the sake of completeness, at this point it should also be mentioned that in alternative embodiments, especially in larger plants, active drying and adsorption materials in the form of bulk material in appropriate containers can also be used instead of the cartridges shown here.

FIG. 2, bottom left, shows the micro-separator 40 in a similar manner. This also comprises a housing 42 having an inlet 44 and an outlet 46, plus a coalescing filter 48 disposed in the housing 42. This separates the aerosols contained in the gas flow from the gaseous phase, so that the purified gas flow can be removed at the outlet 46 and fed to the next component of the plant 100 or 200, while the aerosols accumulate at the bottom of the vessel and can be removed at point 40*a* at a suitable time, as already mentioned above.

Lastly, FIG. 2, lower right, shows the particle filter 70 which also includes a housing 72, an inlet 74, and an outlet 76. Similar to the drying unit 30 and the adsorption unit 50, here the hydrogen gas to be purified enters the housing 72 from below, flows freely upwards, passes a filter cartridge which is equipped with a suitable filter medium, and then leaves the particle filter 70 via the outlet 76 in order to be subsequently fed to the next component of the plant 100 or 200.

The invention claimed is:

1. A system for treating gaseous hydrogen, comprising:
an inlet for supplying gaseous hydrogen,
a drying unit with an active drying material for removing moisture from the supplied hydrogen to produce dried hydrogen,
an adsorption unit with an active adsorbent material for adsorbing impurities from the dried hydrogen to produce treated hydrogen, and
an outlet for drawing off the treated hydrogen,
wherein a mass ratio between the active drying material and the active adsorption material is in a range of 1.5:1 to 50:1.

2. The system according to claim 1,
wherein the active drying material comprises a molecular sieve.

3. The system according to claim 1,
wherein the adsorption unit comprises activated carbon as the active adsorption material.

4. The system according to claim 1, further comprising at least one pressure dew point sensor disposed downstream of the drying unit.

5. The system according to claim 4,
further comprising a control unit that is coupled to the at least one pressure dew point sensor to receive the said sensor data and is adapted to trigger a predefined action when a predefined pressure dew point threshold is exceeded.

6. The system according to claim 1, further comprising at least one further pressure dew point sensor disposed upstream of the drying unit.

7. The system according to claim 1, further comprising:
a micro-separation unit disposed upstream or downstream of the drying unit, and/or
a post-drying unit disposed downstream of the adsorption unit, and/or
a particle filter disposed downstream of the adsorption unit and, if applicable, the post-drying unit, and/or
a minimum pressure valve disposed downstream of the adsorption unit and, if applicable, the post-drying unit and/or the particle filter, and/or
a pressure relief unit disposed upstream of the outlet.

8. The system according to claim 1, wherein the active drying material comprises a silica gel.

9. The system according to claim 1, wherein, with the mass ratio between the active drying material and the active adsorption material in the range of 1.5:1 to 50:1, the system is configured to be continuously operated up to a saturation limit of the active drying material without reaching a saturation limit of the active adsorption material.

10. A plant for providing compressed treated gaseous hydrogen, the plant comprising:

a compressor for compressing supplied gaseous hydrogen, and the system for treating the compressed gaseous hydrogen according to claim 1, wherein the compressor is disposed upstream or downstream of the drying unit.

11. The plant according to claim 10, wherein at least one heat exchanger is assigned to the compressor.

12. The plant according to claim 10, wherein the compressor is of multi-stage design.

13. The plant according to claim 12, wherein a heat exchanger is placed downstream of each stage of the compressor, and/or a separator unit is provided for separating liquid aerosol components in the gas flow after heat exchangers.

14. The plant according to claim 10, further comprising a system control unit which is adapted to switch off the compressor when it is detected that the predefined pressure dew point threshold value has been exceeded.

15. A method of treating gaseous hydrogen by means of a system for treating compressed gaseous hydrogen, the method comprising:

supplying the gaseous hydrogen at an inlet of the system, removing moisture from the supplied hydrogen in a drying unit of the system to produce dried hydrogen, adsorbing impurities from the dried hydrogen in an adsorption unit of the system to produce treated hydrogen, and drawing off the treated hydrogen at an outlet of the system, wherein a mass ratio between the active drying material and the active adsorption material is in a range of 1.5:1 to 50:1.

16. The method according to claim 15, further comprising triggering of a predefined action when at least one predefined pressure dew point threshold is exceeded.

17. The method according to claim 16, wherein a warning is issued when a first predefined pressure dew point threshold value is exceeded, and a shutdown of the system is initiated when a second predefined pressure dew point threshold value is exceeded.

18. The method according to claim 15, wherein the treated hydrogen satisfies the requirements of DIN EN 17124 or ISO 14687.

19. The method according to claim 15, comprising compressing hydrogen to a pressure of up to 350 bar or higher.

20. The method according to claim 15, further comprising continuously operating the system up to a saturation limit of the active drying material without reaching a saturation limit of the active adsorption material.

* * * * *